Figure 1:
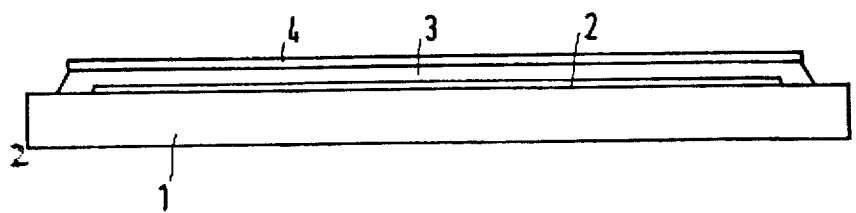

United States Patent [19]

Cnossen et al.

[11] Patent Number: 5,705,220

[45] Date of Patent: Jan. 6, 1998

[54] MANUFACTURE OF A SUBSTRATE HAVING A MODIFIED ORIENTATION LAYER AND OF A LIQUID CRYSTALLINE DISPLAY DEVICE COMPRISING SUCH A SUBSTRATE

[75] Inventors: Gerard Cnossen; Nicolaas P. Willard, both of Eindhoven, Netherlands

[73] Assignee: U.S. Philips Corporation, New York, N.Y.

[21] Appl. No.: 530,783

[22] Filed: Sep. 19, 1995

[30] Foreign Application Priority Data

Sep. 20, 1994 [EP] European Pat. Off. ............ 94202700

[51] Int. Cl.$^6$ ................................................. B05D 5/06
[52] U.S. Cl. .......................... 427/164; 427/166; 427/255.4; 427/340; 427/389.7; 427/393.5; 427/407.2; 427/412.1; 349/183; 428/1
[58] Field of Search ........................ 427/164, 166, 427/255.4, 389.7, 393.5, 340, 407.2, 412.1; 349/183; 428/1

[56] References Cited

U.S. PATENT DOCUMENTS

| | | | |
|---|---|---|---|
| 5,173,342 | 12/1992 | Sato et al. | 428/1 |
| 5,231,523 | 7/1993 | Nakaya et al. | 359/56 |
| 5,422,148 | 6/1995 | Itoh et al. | 428/1 |

*Primary Examiner*—Janyce Bell
*Attorney, Agent, or Firm*—John C. Fox

[57] ABSTRACT

The invention relates to a method of manufacturing a substrate having a modified orientation layer and a liquid-crystalline display device comprising such a substrate. The orientation layer is made from a polymer and is modified with organic groups which induce a pretilt in the liquid-crystalline material when they are used in a liquid-crystalline display device. According to the invention, for modifying the orientation layer use is made of a precursor compound of the organic groups which is vaporized, whereafter the substrate carrying the orientation layer is exposed to the vapour formed in the process. Preferably, the orientation layer comprises hydroxyl groups such as PVA, and a carboxylic acid halogenide such as an alkyloyl chloride is used as the precursor. A further favourable combination comprises orientation layers of polyamide acid and alkylamine precursor compounds.

5 Claims, 3 Drawing Sheets

MANUFACTURE OF A SUBSTRATE HAVING A MODIFIED ORIENTATION LAYER AND OF A LIQUID CRYSTALLINE DISPLAY DEVICE COMPRISING SUCH A SUBSTRATE

The invention relates to a method of reacting pretilt-inducing organic groups with an orientation layer of an organic polymer which is provided on a substrate. The invention also relates to a method of manufacturing a liquid crystalline display device comprising such a substrate.

BACKGROUND OF THE INVENTION

Liquid crystalline display devices essentially comprise two substantially parallel substrates the facing surfaces of which are provided with an electrode or an electrode array as well as an orientation layer. The space between the substrates is filled with a layer of a liquid crystalline material. The molecules of the liquid crystalline material which lie against the orientation layer exhibit a molecular ordering in the plane of the substrate on which the orientation layer is provided. This ordering is parallel to the direction of orientation of this layer. The directions of orientation of the orientation layers in the display device of the twisted nematic type customarily extend at an angle of 90° with respect to each other. The directions of orientation of these layers in devices of the ferroelectric type, however, extend substantially (anti)parallel with respect to each other.

In addition to the planar orientation of the liquid-crystalline molecules, there should also be an extra-planar orientation of the molecules, so that they extend at a certain angle with respect to the substrate. This angle is referred to as the "pretilt" angle. This pretilt angle is necessary to preclude certain molecular defects in the layer of liquid-crystalline material. In the case of nematic materials, these defects relate, in particular, to the undesired formation of areas having an opposite tilt. In the case of ferroelectric materials, the defects relate to undesired zigzag structures. These defects lead to a reduction of the contrast in the ultimate display devices.

A method of modifying orientation layers of organic polymers, as mentioned in the opening paragraph, is known per se from U.S. Pat. No. 5,173,342. The document more particularly describes how a substrate carrying an electrode layer and an orientation layer is provided with pretilt-inducing organic groups. The material of the orientation layer comprises polyvinyl alcohol (PVA), polyethylene oxide (PEO) and methyl cellulose (ME). Fluoridized alkyl groups are used as the pretilt-inducing organic groups. These groups are obtained by providing a solution of a precursor compound of these groups on the orientation layer. In this process, the precursor compound decomposes, thereby forming fluoridized alkyl groups which react with the orientation layer. Silane compounds are used as the precursor compound.

The known method has disadvantages. For example, it has been found in practice that, using the known method, it is difficult to apply well-defined monolayers of the pretilt-inducing groups. It has been demonstrated that, owing to polymerization reactions of the silane compounds in the solution, multilayers, incomplete monolayers and/or inhomogeneous monolayers are easily formed on the orientation layer. As a result thereof, an ill-defined pretilt is obtained and the reproducibility of the known method is unsatisfactory. All this leads to an unacceptable decrease in quality of the final liquid-crystalline display device.

Another important disadvantage of the known method is caused by the presence of the solvent. In particular organic solvents, such as tetrachloromethane, which is used in this known method, may adversely affect the quality of the orientation layer of polymeric material. Particularly when this layer is in contact with the solvent for a long period of time, it may swell up or be otherwise adversely affected. Such swelling of the layer may cause the existing orientation of the orientation layer to be lost. Also these phenomena adversely affect the quality of the final liquid-crystalline display device.

SUMMARY OF THE INVENTION

It is an object of the invention to obviate the disadvantages of the known method. The invention more particularly aims at providing a method in which a reaction between pretilt-inducing groups and an orientation layer of an organic material can be brought about in a well-defined and reproducible manner. The inventive method should, in particular, be suitable for mass production.

These and other objects are achieved by the method described in the opening paragraph, which is characterized in accordance with the invention in that a precursor compound of the organic groups is evaporated and in that the substrate carrying the orientation layer is exposed to the vapour formed in this process.

In the method in accordance with the invention, the organic groups are not reacted from a solution with the orientation layer. This has the important advantage that no solvents are brought into contact with the orientation layer. As a result, a number of process steps relating to the removal of solvents are superfluous in the method in accordance with the invention. In addition, a method of providing from the vapour phase has the advantage that this process step can be readily integrated in mass production, for example in a continuous process. It has further been found that the organic molecules provided by the method in accordance with the invention form well-defined and homogeneous monolayers on the orientation layers.

For the orientation layer, use can in principle be made of all types of organic polymers which can be oriented. Orienting takes place by subjecting the layer to a mechanical treatment. Well-known physical treatments include stretching, rubbing or rolling of the layer in a certain direction. Organic polymers which can suitably be used for this purpose are, inter alia, polyvinyl alcohol, polyamide acid, polystyrene, polysiloxanes, polyesters, polyimides, polyoxazoles, polythiazoles, polyimidazoles, polyoxazinones, polyoxazindiones, polyamides, polycarbonates or polytetrafluoroethylene as well as copolymers thereof.

The choice of the precursor compound is subject to various conditions. For example, it must be possible to convert the precursor compound to a vapour state. In addition, this compound must be sufficiently reactive with the material of the orientation layer used. Other parameters in the provision process are the temperature (customarily between 0° and 200° C.), setting the partial vapour pressure of the precursor compound when the compound is mixed with other, inert compounds, and the reaction duration.

A favourable embodiment of the method in accordance with the invention is characterized in that the orientation layer comprises hydroxyl groups and in that a carboxylic acid halogenide is used as the precursor compound. These hydroxyl groups may naturally be present in the organic material of the orientation layer. It is alternatively possible, however, to provide these hydroxyl groups at a later stage by subjecting the layer to a treatment in which these reactive groups are formed. Examples of such a treatment are plasma, UV and/or ozone treatments of the orientation layer. It has been found that carboxylic acid halogenides convened to the vapour phase react very well with hydroxyl groups of a polymeric material, thereby separating hydrogen halogenide. A well-defined monolayer of bound organic groups is formed in this manner, which extends over the entire surface of the orientation layer. The density of the layer provided is proportional with the residence time in the vapour. Consequently, the pretilt angle can be adjusted in a controlled manner.

The carboxylic acid halogenides in accordance with this favourable embodiment may comprise different types of pretilt-inducing organic groups. These organic groups may or may not comprise an halogenated alkyl chain which, if desired, is provided with one or more aromatic groups. The alkyl chain is preferably unbranched. If desired, the organic group comprises a liquid-crystalline unit.

A further interesting embodiment of the method in accordance with the invention is characterized in that the orientation layer is mainly composed of polyvinyl alcohol and in that an alkyloyl chloride is used as the precursor compound. This type of orientation layer has a high density of hydroxyl groups. In addition, it has been found that alkyloyl chlorides react relatively rapidly with this type of orientation layer. This combination of properties results in an embodiment which is very attractive for mass production.

An extremely favourable embodiment of the method in accordance with the invention is characterized in that the orientation layer is composed of a polyamide acid and in that an alkylamine is used as the precursor. By treating this acid with the precursor, a layer of amide-amide acid polymer is formed. By means of a temperature treatment, said polymeric layer can be converted, if desired, to an amide-imide polymeric layer. The alkyl chain of the precursor may or may not be halogenated and, if desired, it may comprise one or more aromatic groups, so that the chain may exhibit liquid-crystalline properties. However, the alkyl chain is preferably unbranched. n-Alkylamines having 9 to 14 C atoms, such as preferably n-dodecaneamine, have proved to be very advantageous.

The invention also relates to a method of manufacturing a liquid-crystalline display device comprising two parallel substrates whose facing surfaces are provided with an orientation layer and between which substrates a liquid-crystalline material is interposed. This method is characterized in accordance with the invention in that the orientation layer is provided with pretilt-inducing organic groups from the vapour phase in the manner described hereinabove. Display devices manufactured in accordance with the inventive method exhibit considerably fewer defects in the liquid-crystalline material than devices manufactured in accordance with the known method.

BRIEF DESCRIPTION OF THE DRAWING FIGURES

These and other aspects of the invention will be apparent from and elucidated with reference to the embodiments described hereinafter.

Figure 2:
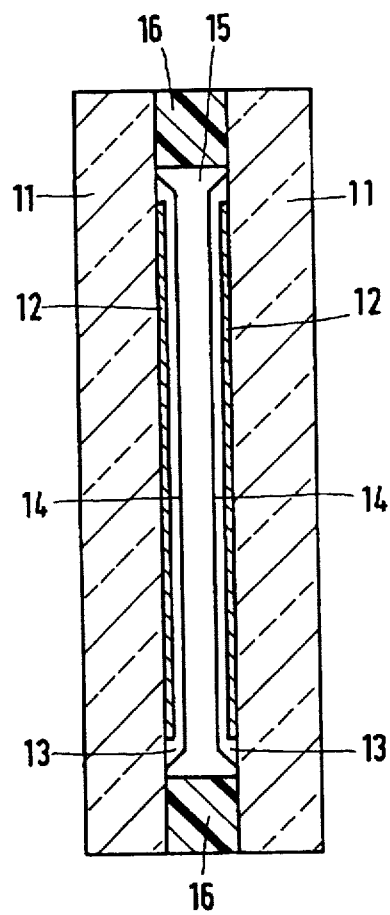
Figure 3:
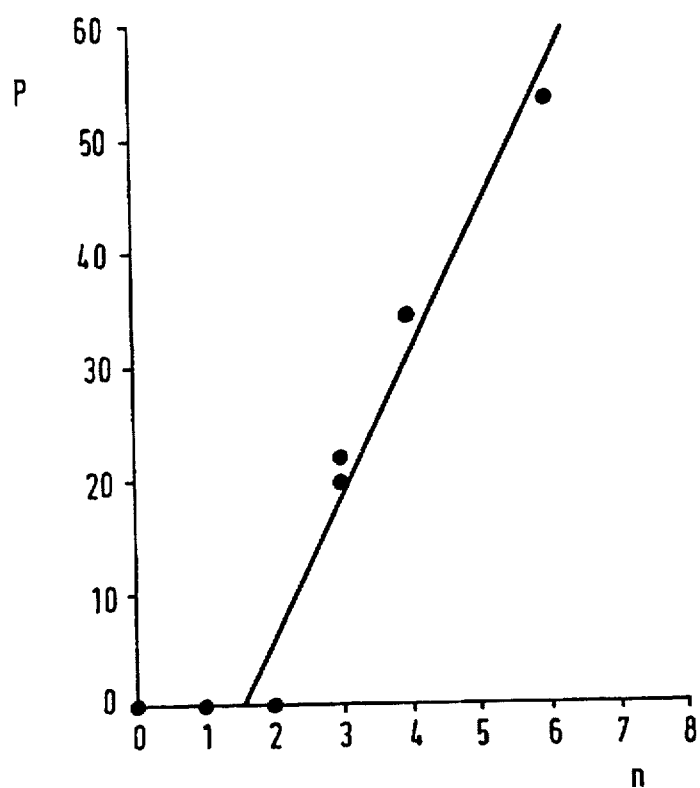
Figure 4:
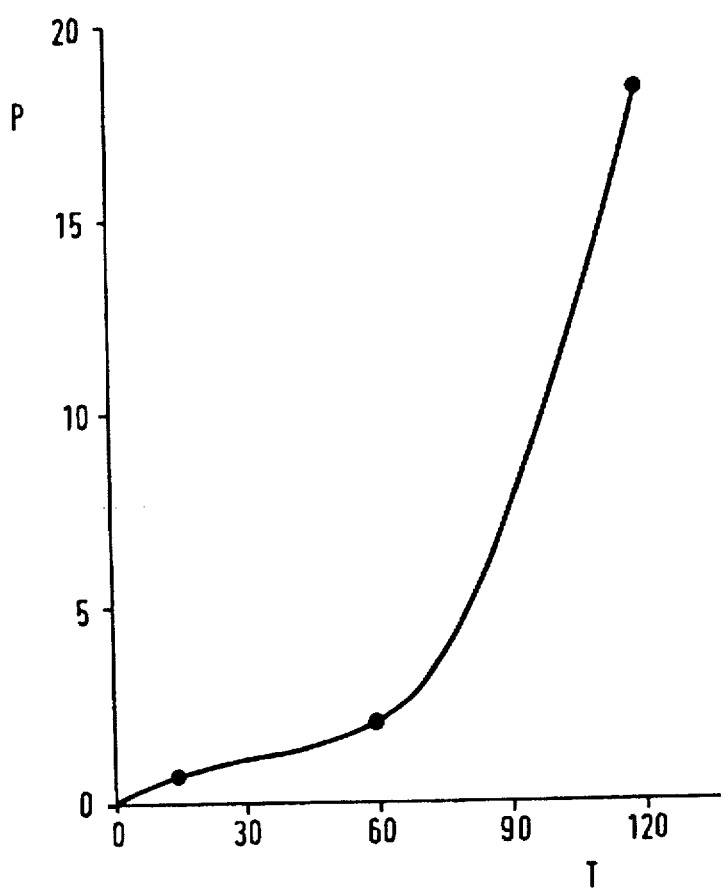
Figure 5:
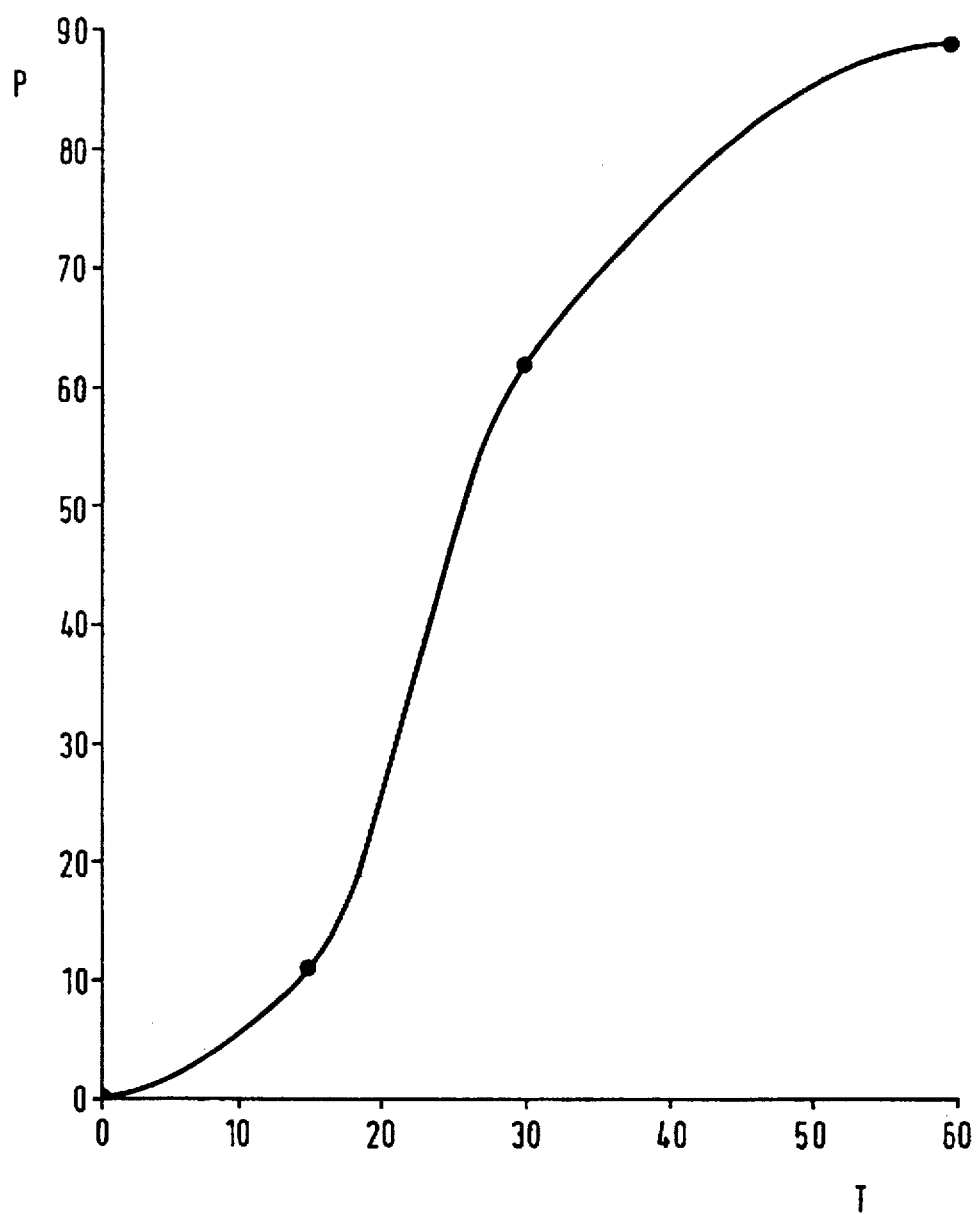

In the drawings:

FIG. 1 schematically shows a substrate having an orientation layer which is modified in accordance with the invention, FIG. 2 schematically shows a liquid-crystalline display device in accordance with the invention, FIG. 3 shows a graph in which the pretilt angle of an orientation layer on a substrate is plotted as a function of the chain length of a specific precursor compound bound to the layer, FIGS. 4 and 5 show graphs in which the pretilt angle of an orientation layer on a substrate is plotted as a function of the duration of the reaction between the layer and a specific precursor compound.

DESCRIPTION OF THE INVENTION

It is noted that the components in the drawings are not drawn to scale.

Reference numeral 1 in FIG. 1 denotes a transparent substrate of glass (Corning 7059). Instead of glass, use can alternatively be made of a transparent synthetic resin, which may or may not be flexible, such as PMMA. This glass substrate is provided with a transparent electrode layer 2, for example, of sputtered indium-tin-oxide (ITO). An orientation layer 3 of an oriented polymeric material is applied to electrode layer 2. In this case, the orientation layer was composed of polyvinyl alcohol (PVA). On the surface facing away from the substrate, layer 3 is provided with a layer 4 of pretilt-inducing organic groups. In this case, the groups were composed of a linear alkyloyl unit.

The structure of FIG. 1 was manufactured in the following manner. The substrate 1 was carefully cleaned by means of an ultrasonic treatment in a soap-containing water/alcohol mixture. The cleaned substrate was first provided with a thin ITO electrode layer (typically 35 nm) by sputtering. Subsequently, a thin film of a PVA solution (1 wt. % in water) was spun onto the electrode layer. The polymeric layer obtained in this manner was dried in a vacuum at 120° C. for 90 minutes.

Subsequently, the substrate carrying the orientation layer was exposed at room temperature to an atmosphere comprising argon as the precursor compound and a linear alkyloyl chloride in the vapour state. The precursor used in this case corresponds to the formula n-$C_nH_{2n-1}$OCl, wherein 0<n<16. The reaction time was varied from 10 minutes to 16 hours. During the exposure, decomposition of the alkyloyl chloride occurs and the alkyloyl unit is bound to the PVA via and oxygen atom. Further, a hydrogen atom is separated from the PVA, which along with Cl, which is separated from the precursor compound, escapes as HCl. After the treatment, the substrate carrying the orientation layer and the layer 4 having pretilt-inducing groups was kept in a rough vacuum for 60 minutes to remove physically adsorbed material. Subsequently, the orientation layer and the pretilt layer were rubbed with a cotton cloth, thereby orienting the polymeric main chains of the PVA. It has been found that this orientation step can also be used prior to the provision of layer 4.

A number of pairs of substrates manufactured as described above were used to manufacture liquid-crystalline display devices as shown in FIG. 2. These display devices had two substrates 11 which were each provided with an electrode layer 12 and an orientation layer 13. The surface 14 of the orientation layers was modified in accordance with the method of the invention. Between both substrates there was a space which was filled with a liquid-crystalline material 15 (K15, supplier BDH). The space was sealed by means of a sealing strip 16. The devices examined differed only in the type of pretilt-inducing groups which were bound to the orientation layer.

The pretilt of the liquid-crystalline material was measured on the various devices by means of the so-called phase-retardation method. FIG. 3 shows a graph in which the pretilt angle (P in degrees) is plotted as a function of the length n (T-number of C-atoms) of the alkyl chain of the precursor compound which was used in the manufacture of the pretilt layer. The reaction time was the same for each device. This figure shows that there is a clear linear relation between the pretilt angle and the length of the alkyl chain.

In further experiments, the residence time of the substrates carrying an orientation layer of PVA in an alkanoyl chloride-containing vapour was varied. The results of a first series of experiments for hexanoyl chloride ($C_6H_{13}OCl$) are shown in FIG. 4. In this figure, the pretilt angle P (in degrees) of a number of the display devices is shown as a function of the residence time T (in minutes) of the substrates in the precursor vapour. It is clear from this Figure that the density of the pretilt layer is proportional to the residence time of the substrates in the vapour. The results of a second series of experiments are shown in FIG. 5. For this series, dodecanoyl chloride ($C_{12}H_{23}OCl$) was used as the precursor compound. A comparison between both series of experiments shows that a more uniform orientation is obtained when the chain length is greater (n>10). Thus, the chain length is preferably 10 to 15 C atoms. In the case of such relatively long chains, it is preferable to rub the orientation layers after the surface modification process.

Further, the quality of the ordering of the liquid-crystalline material of the devices manufactured in accordance with the inventive method was compared to that of devices manufactured in accordance with the state of the art. This comparison revealed that in the liquid-crystalline material of the first-mentioned devices considerably fewer defects occurred than in the comparable, state-of-the-art devices. Consequently, the inventive method enables to react, in a controlled and reproducible manner, monolayers of pretilt-inducing organic groups with an orientation layer of an organic polymer provided on a substrate.

We claim:

1. A method of reacting pretilt-inducing organic groups with an orientation layer of an organic polymer which is provided on a substrate, the orientation layer being intended to induce a molecular ordering in the plane of the substrate of molecules of a liquid crystalline material lying against the orientation layer, and the pretilt-inducing organic groups being intended to induce a pretilt angle between the substrate and molecules of the liquid crystalline material in contact with the pretilt-inducing organic groups on the orientation layer, characterized in that a precursor compound of the organic group is vaporized and in that the substrate carrying the orientation layer is exposed to the vapour formed in this process.

2. A method as claimed in claim 1, characterized in that the orientation layer comprises hydroxyl groups and in that a carboxylic acid halogenide is used as the precursor compound.

3. A method as claimed in claim 2, characterized in that the orientation layer is mainly composed of polyvinyl alcohol and in that an alkyloyl chloride is used as the precursor compound.

4. A method as claimed in claim 1, characterized in that the orientation layer is composed of a polyamide acid and in that an alkylamine is used as the precursor compound.

5. A method of manufacturing a liquid-crystalline display device comprising two parallel substrates whose facing surfaces are provided with an orientation layer and between which substrates a liquid-crystalline material is interposed, characterized in that said orientation layers comprise organic groups which are provided by means of the method as claimed in claim 1.

* * * * *